United States Patent [19]

Borelan et al.

[11] 3,987,279
[45] Oct. 19, 1976

[54] AUTOMATIC PERFORMANCE RESERVE (APR) SYSTEM

[75] Inventors: Alexander P. Borelan, Bellevue; James T. Giffin, Renton; Peter J. Louden, Mercer Island; Malcolm L. Olthouse, Bellevue, all of Wash.

[73] Assignee: The Boeing Company, Seattle, Wash.

[22] Filed: Apr. 22, 1975

[21] Appl. No.: 570,928

[52] U.S. Cl. ........................ 235/150.21; 60/39.15; 244/53 R
[51] Int. Cl.[2] ................. B64D 27/00; G06F 15/50
[58] Field of Search ............... 235/150.21, 153 AE, 235/153 AK; 244/53 R; 60/39.15

[56] References Cited
UNITED STATES PATENTS

| | | | |
|---|---|---|---|
| 3,434,281 | 3/1969 | Donaldson | 60/39.15 |
| 3,514,055 | 5/1970 | Gregoire et al. | 60/39.15 |
| 3,518,023 | 6/1970 | Britten et al. | 60/39.15 |
| 3,715,093 | 2/1973 | Van Dyke | 60/39.15 |
| 3,764,785 | 10/1973 | Harner et al. | 235/150.21 |
| 3,811,273 | 5/1974 | Martin | 60/39.15 |
| 3,875,390 | 4/1975 | Eccles et al. | 235/153 AE |

*Primary Examiner*—Joseph F. Ruggiero
*Assistant Examiner*—Errol A. Krass
*Attorney, Agent, or Firm*—Conrad O. Gardner

[57] ABSTRACT

A logic controlled APR system including arming logic, engine failure detection circuits, and system fault detector circuit means for monitoring system integrity. The logic controlled APR system detects an engine failure in a multi-engine aircraft and provides increased fuel flow to the remaining normally operating engines, and includes a disarm mode in the event of an RTO (rejected take-off).

5 Claims, 1 Drawing Figure

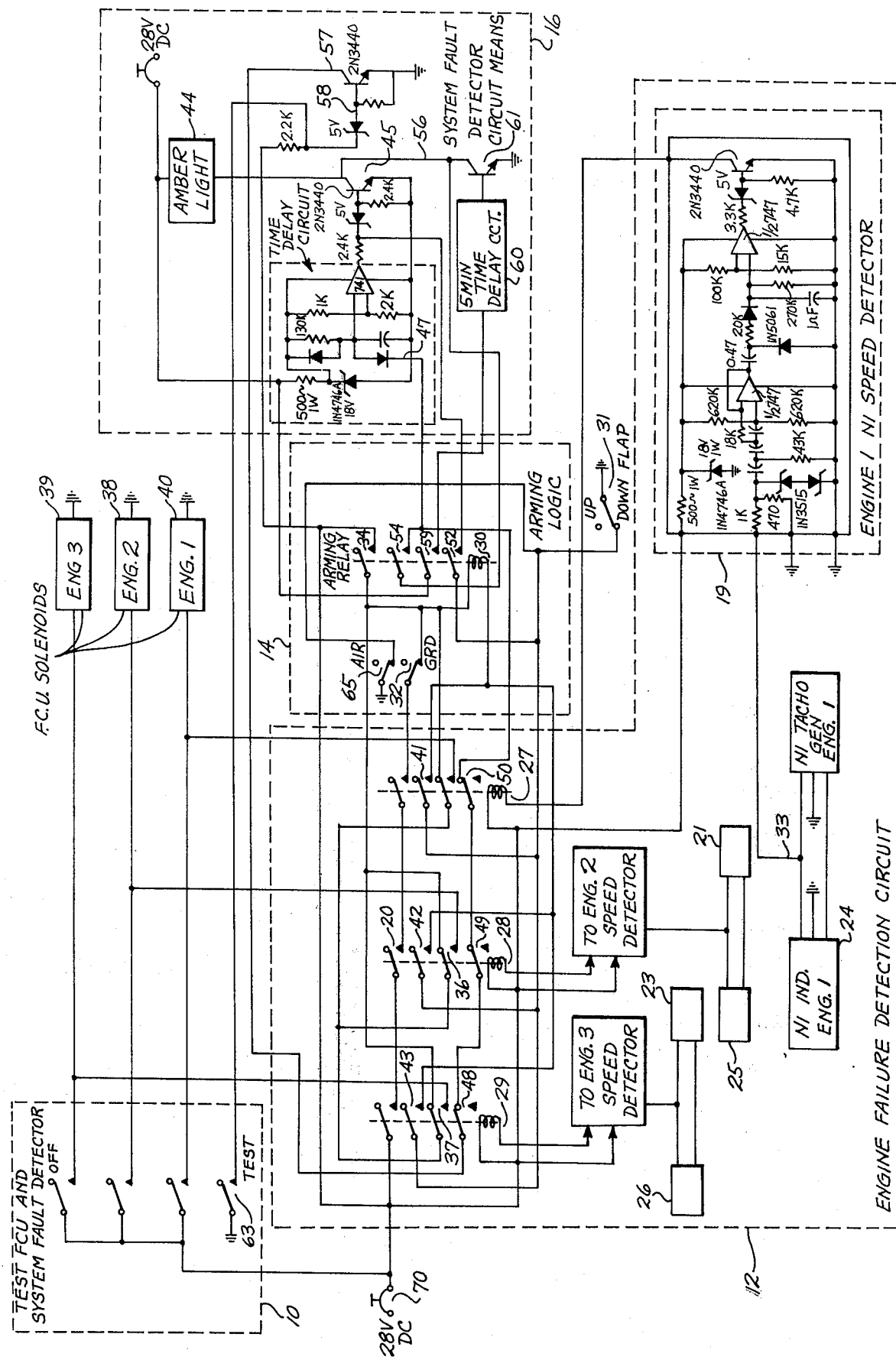

AUTOMATIC PERFORMANCE RESERVE (APR) SYSTEM

SUMMARY OF THE INVENTION

The potential gross weight that an aircraft could carry upon departure from a performance limited airfield is reduced in accordance with present regulatory limits relating to field length, take-off second segment (engine out) gradient, and near/remote obstacle clearance.

It is accordingly an object of the present invention to provide a self-monitoring automatic electrical control system in an aircraft, which in the event of an engine failure during take-off, increases the operating engine(s) thrust within the maximum allowable margin of engine limits thereby obtaining a significant payload benefit in aircraft performance.

A previous system which is shown in U.S. Pat. No. 3,514,055 by Gregoire et al assigned to the assignee of the present invention provided shut-off of auxiliary units to provide an increase in thrust energy available during take-off in response to an engine failure, the system of the referred to patent being exemplary of one of the various approaches previously utilized to provide increased thrust in the event of an engine failure during take-off. The present system, in contrast, is a self-monitoring logic actuated system responsive to aircraft operating parameters for controlling fuel control solenoids (FCU) associated with the respective engines which when actuated increase fuel flow to provide an incremental increase in thrust (e.g. 1000 lbs.) on remaining engines in the event of an engine failure during take-off. Also, the aircraft operating parameter preferred to provide a signal representative of engine failure in the aircraft in the present APR system is the $N_1$ compressor speed in contrast to 13th stage pressure utilized in the system of the hereinbefore referenced patent, or such other engine operating parameters such as EPR. $N_1$ compressor speed provides rapid engine failure recognition, is not sensitive to engine surge, and is a signal available directly from the engine which is also provided in conventional pilot displays at the cockpit.

In accordance with a preferred embodiment of the invention, APR system arming logic requires (1) flaps of the aircraft extended (greater than 1°), (2) aircraft on the ground (main gear compressed), and (3) $N_1$ speed of the engines greater than a first predetermined speed (e.g. 6400 rpm, representative of take-off condition). Decay of $N_1$ speed below a second predetermined speed less than the first predetermined speed (e.g. 5600 rpm, representative of engine failure) results in APR signal energization of the engine FCU (fuel control unit) solenoid scheduling more fuel and increased thrust on the operating engine(s). System response time between engine failure and obtaining 95 percent of the APR thrust increment commanded by the APR signal is less than about 2 seconds.

It is yet another object of the invention to provide an APR system which becomes disarmed in the event of a rejected take-off in response to movement of all aircraft throttles to the idle position.

Another object of the present invention is to provide means for energizing the APR system fault light (amber light) a predetermined time period (e.g. 5 minutes) subsequent to arming of the APR system if the system has not been disarmed by raising or retracting of the flaps in normal aircraft operation subsequent to take-off.

Other objects, features, and advantages of the disclosed automatic performance reserve system will be apparent from the following detailed description, together with the accompanying drawing illustrative only of a preferred embodiment of the invention.

BRIEF DESCRIPTION OF DRAWING

The drawing diagrammatically illustrates by way of example not by way of limitation, one form of the invention in which:

the sole FIGURE illustrates by way of block diagram and circuit schematic the logic controlled automatic performance reserve system, having system fault detector circuit means for monitoring system integrity.

DETAILED DESCRIPTION OF THE DRAWING

The APR system comprises an engine failure detector circuit 12 for each engine, an arming logic circuit 14, a system fault detector circuit means 16, a test switch 10 to test the system fault circuit 16 and the fuel control unit (FCU) solenoids 38, 39, and 40.

The system shown in the FIGURE is for a three engined aircraft but the same concepts may be used for aircraft having a different number of engines.

Each engine has a speed detector circuit 19, 21, 23, which detects engine speed from the existing $N_1$ indicating systems 24, 25, 26, which energizes the speed detector relays 27, 28, and 29, when the engines are at take-off speed.

The arming logic consists of an arming relay 30, a flap switch 31 and an air/ground logic switch 32.

When engine number 1 is operated at take-off speed, the engine speed detector 19 detects the engine speed by signal 33 from the $N_1$ indicating circuit and energizes the speed detector relay 27. Similarly engines 2 and 3 speed detector relays 28 and 29 are energized by running engines 2 and 3 at take-off speed.

The arming relay 30 is energized only when the air/ground switch 32 is in the ground position, to prevent arming of the APR system in the air, the flaps are extended greater than 1° closing the flap switch 31 and all three speed detector relays 27, 28, 29 are energized when all engines are at take-off speed. The arming relay 30 is held in the energized position by its own contacts 34 such that de-energizing of any of the speed detector relays 27, 28, 29 or opening of the air/ground switch 32 when the aircraft leaves the ground does not de-energize the arming relay 30.

If during take-off and before the flaps are retracted engine number 1 fails, this will be detected by engine number 1 speed detector 19 by loss of the signal 33 from the $N_1$ indicating system and de-energizing of speed detector relay 27. A signal will then be supplied from the 28 volt power source to engines 2 and 3 FCU solenoids 38 and 39 through relay contacts 34 of the arming relay 30, contacts 35 of number 1 engine speed detector relay 27 now de-energized, contacts 36 and 37 of engine numbers 2 and 3 speed detector relays 28 and 29 both energized.

Similarly, if during take-off engine number 2 failed, engines 1 and 3 FCU solenoids 39 and 40 would be energized, engine number 2 speed detector relay 28 would now be de-energized instead of number 1 speed detector relay 27. Similarly, if engine number 3 failed, engines 1 and 2 FCU solenoids 38 and 40 would be energized, engine number 3 speed detector relay 29 would now be de-energized instead of number 1 speed detector relay 27.

The system has no on/off control switch and after being armed during take-off will remain armed until the flaps are retracted. When the flaps are retracted (less than 1°), the flap switch 31 opens and the arming relay 30 de-energizes, the system cannot now be used until re-armed.

If during take-off and before lift-off it is decided to abort the take-off (RTO) then when all three engines rpm is reduced for example below 5,600 rpm the speed detector circuits 19, 21, and 23 will detect the change in speed and de-energize the speed detector relays 27, 28, 29. Contacts 41, 42 and 43 of the speed detector relay 27, 28, and 29 (previously closed) will all now open. These contacts 41, 42, and 43 are connected in parallel and when all three are open, arming relay 30 is de-energized.

The system fault detector circuit 16 is used to light an amber light 44 under any of the following conditions:
a. loss of power from the 28 volt power source 70, the fault detector circuit utilizes a second power source 71.
b. failure of the arming relay 30 to energize when all three engines are at take-off rpm.
c. failure of the arming relay 30, to de-energize when all three engines are reduced below approximately 5,600 rpm.
d. failure of the flap switch 31 to de-energize the arming relay 31 5 minutes after the system was armed.

The fault light 44 is switched on by transistor 45 controlled through a time delay circuit 46. The time delay circuit 46 commences timing when the ground signal 47 from the time delay circuit 46 is removed by the opening of any one of the speed detector relays 27, 28, 29; contacts 48, 49, 50. After approximately 3 seconds, a signal 51 from the time delay circuit 46 triggers transistor 45 to switch on the fault light 44. Before the time delay circuit 46 has timed out the arming relay 30 should have energized and contacts 52 closed grounding the signal 51 to transistor 45 and preventing the fault light 44 from illuminating. Failure of the arming relay 30 would operate the fault light 44 as mentioned in b above.

If the arming relay 30 remains energized after all three engine rpm's are reduced below 5,600 rpm then contacts 55 of the arming relay 30 would remain closed and the fault light 44 will illuminate as mentioned in c. above by a signal 56 from the fault light 44 through contacts 55 of the arming relay 30 and contacts 50, 49, and 48 of speed detector relays 27, 28, and 29 and transistor 57.

Loss of power from the 28 volt power source mentioned in paragraph a above would result in loss of the signal 58, switching off transistor 57. This would result in the timing circuit 46 commencing timing and triggering transistor 45 to illuminate the fault light 44.

A five minute time delay circuit 60 is started when the arming relay 30 is energized, after approximately five minutes the time delay circuit 60 switches transistor 61 on to illuminate the fault light 44 as mentioned in paragraph c. The flap switch 31 would normally de-energize the arming relay 30 before the time delay circuit 60 has timed out.

A test switch 63 is provided which when held on provides APR signals to all three engine FCU solenoids 38, 39 and 40 to test these solenoids when the engines are running at idle speed. An increase in engine speed will be seen on each engine $N_1$ indicator 24, 25, and 26.

The test switch 63 also removes the signal 58 from transistor 57 thus the timing circuit 46 would time out triggering transistor 45 and illuminating the fault light 44. This checks out the integrity of the system fault detector circuit 16.

The ground for the timing circuit 46 and transistor 45 connects through the air/ground switch 65 to prevent the fault light 44 illuminating in the air after the flap switch 31 has de-energized the arming relay 30. The fault light 44 would illuminate when contacts 52 of the arming relay open circuit and with the speed detector relays 27, 28 and 29 energized as mentioned in paragraph b above.

We claim:
1. In combination in an aircraft having a plurality of engines, each of said engines having associated therewith fuel flow control means:
   detector circuit means associated with each of said engines for detecting engine failure;
   first means responsive to said detector circuit means in the event of an engine failure for actuating said fuel flow control means associated with the remaining engines; and
   second means representative of a rejected take-off condition of said aircraft for disarming said first means in the event of a rejected take-off condition thereby preventing actuation of said fuel flow control means.
2. In combination in an aircraft having a plurality of flaps and a plurality of engines, each of said engines having associated therewith fuel flow control means:
   detector circuit means associated with each of said engines for detecting engine failure;
   first means responsive to said detector circuit means in the event of an engine failure for actuating said fuel flow control means associated with the remaining engines;
   fault detector circuit means including a fault lamp coupled to said first means for energizing said fault lamp in response to a fault condition of said first means; and
   said fault detector circuit means including means for actuating said fault lamp a predetermined time period subsequent to arming of said first means in the event that the flaps of said aircraft have not been retracted.
3. In an automatic performance reserve system for an aircraft having a plurality of engines:
   first means associated respectively with each of said engines for providing increased fuel flow to the engine;
   speed detector circuit means associated respectively with each of said engines responsive to engine speed;
   relay means responsive to said speed detector circuit means for arming said automatic performance reserve system in response to engine speeds of said plurality of engines representative of take-off power;
   said relay means further responsive to said speed detector circuit means for detecting an engine speed representative of failure of one of said plurality of engines and actuating said first means associated with the remaining ones of said plurality of engines;

second means for disarming said automatic performance reserve system subsequent to take-off of the aircraft and deactuating said first means associated with the remaining ones of said plurality of engines in the event of failure of one of said plurality of engines;

system fault lamp indicator means;

system fault detector circuit means coupled to said fault lamp indicator means for actuating said fault lamp indicator means in response to a failure condition of said relay means prior to selection of take-off power for said engines; and test switch means coupled to said system fault detector circuit means for testing said system fault detector circuit means.

4. In an automatic performance reserve system for an aircraft having a plurality of engines:

first means associated respectively with each of said engines for providing increased fuel flow to the engines;

speed detector circuit means associated respectively with each of said engines responsive to engine speed;

relay means responsive to said speed detector circuit means for arming said automatic performance reserve system in response to engine speeds of said plurality of engines representative of take-off power;

said relay means further responsive to said speed detector circuit means for detecting an engine speed representative of failure of one of said plurality of engines and actuating said first means associated with the remaining ones of said plurality of engines;

second means for disarming said automatic performance reserve system subsequent to take-off of the aircraft and deactuating said first means associated with the remaining ones of said plurality of engines in the event of failure of one of said plurality of engines;

system lamp indicator means;

system detector circuit means coupled to said lamp indicator means for actuating said lamp indicator means in response to said relay means for arming said automatic performance reserve system; and, test means coupled to said system for testing said system.

5. In combination in an aircraft having a plurality of engines, each of said engines having associated therewith fuel flow control means:

detector circuit means associated with each of said engines for detecting engine failure;

first means responsive to said detector circuit means in the event of an engine failure for increasing the thrust of the remaining engines within the maximum allowable margin of engine limits; and, second means representative of a rejected take-off condition of said aircraft for disarming said first means in the event of a rejected take-off condition thereby preventing operation of engines at maximum thrust.

* * * * *